4 Sheets—Sheet 1.
E. R. SQUIBB.
MANUFACTURE OF ACETIC ACID.
No. 185,141. Patented Dec. 5, 1876.
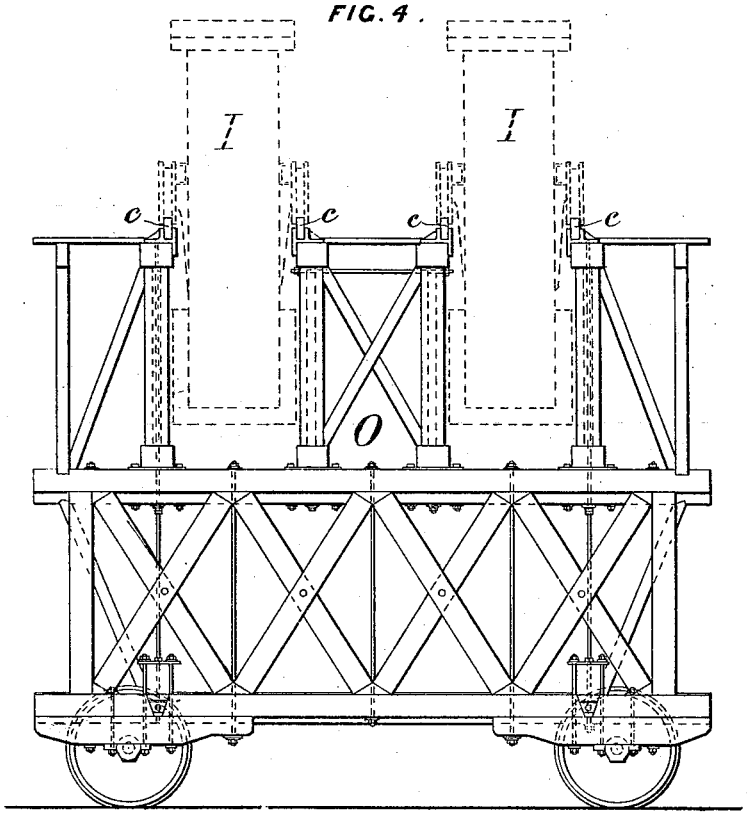
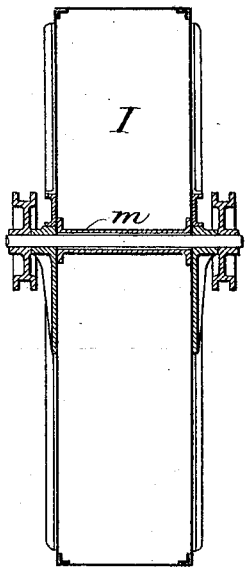
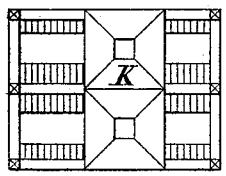
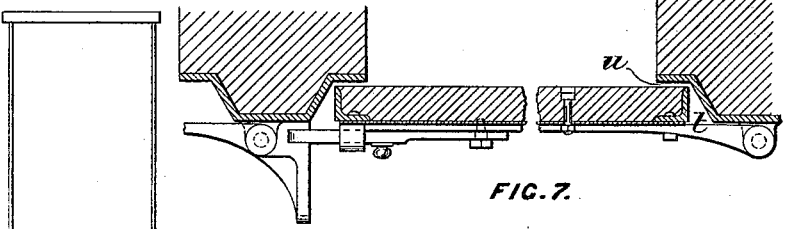
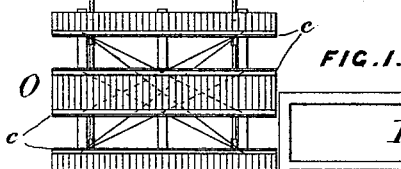
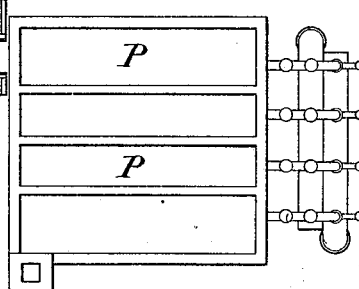
WITNESSES
INVENTOR
Edward R. Squibb,
by Munson & Philipp
his Atty.

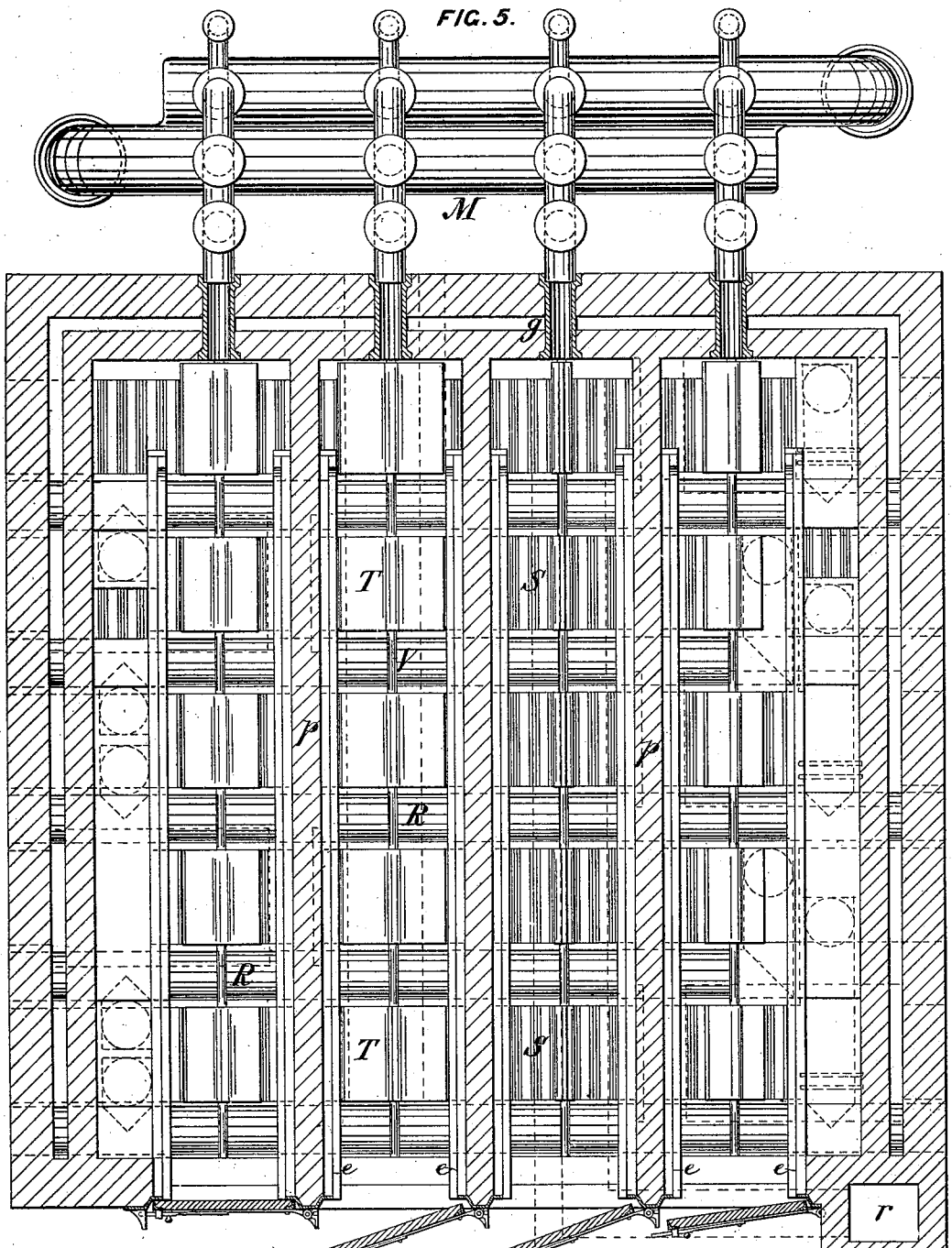

4 Sheets—Sheet 4.

E. R. SQUIBB.
MANUFACTURE OF ACETIC ACID.

No. 185,141. Patented Dec. 5, 1876.

WITNESSES
C. H. Ridenour
E. B. Munson

INVENTOR
Edward R. Squibb,
by Munson & Philipp,
his Attys.

UNITED STATES PATENT OFFICE.

EDWARD R. SQUIBB, OF BROOKLYN, NEW YORK.

IMPROVEMENT IN THE MANUFACTURE OF ACETIC ACID.

Specification forming part of Letters Patent No. 185,141, dated December 5, 1876; application filed May 15, 1876.

*To all whom it may concern:*

Be it known that I, EDWARD R. SQUIBB, of the city of Brooklyn, county of Kings and State of New York, have invented certain new and useful Improvements in the Manufacture of Acetic Acid; and I do hereby declare the following to be a full, clear, and exact description of the same, reference being had to the accompanying drawings, forming a part of this specification.

The object of my invention is to practically carry out the processes described and claimed in certain Letters Patent of the United States, granted to Theodore Schwartz, March 29, 1870, No. 101,319, and to produce the articles described and claimed in the patent granted to him of even date therewith, No. 101,320; and it consists in the process and apparatus hereinafter fully described and claimed.

Figure 2:
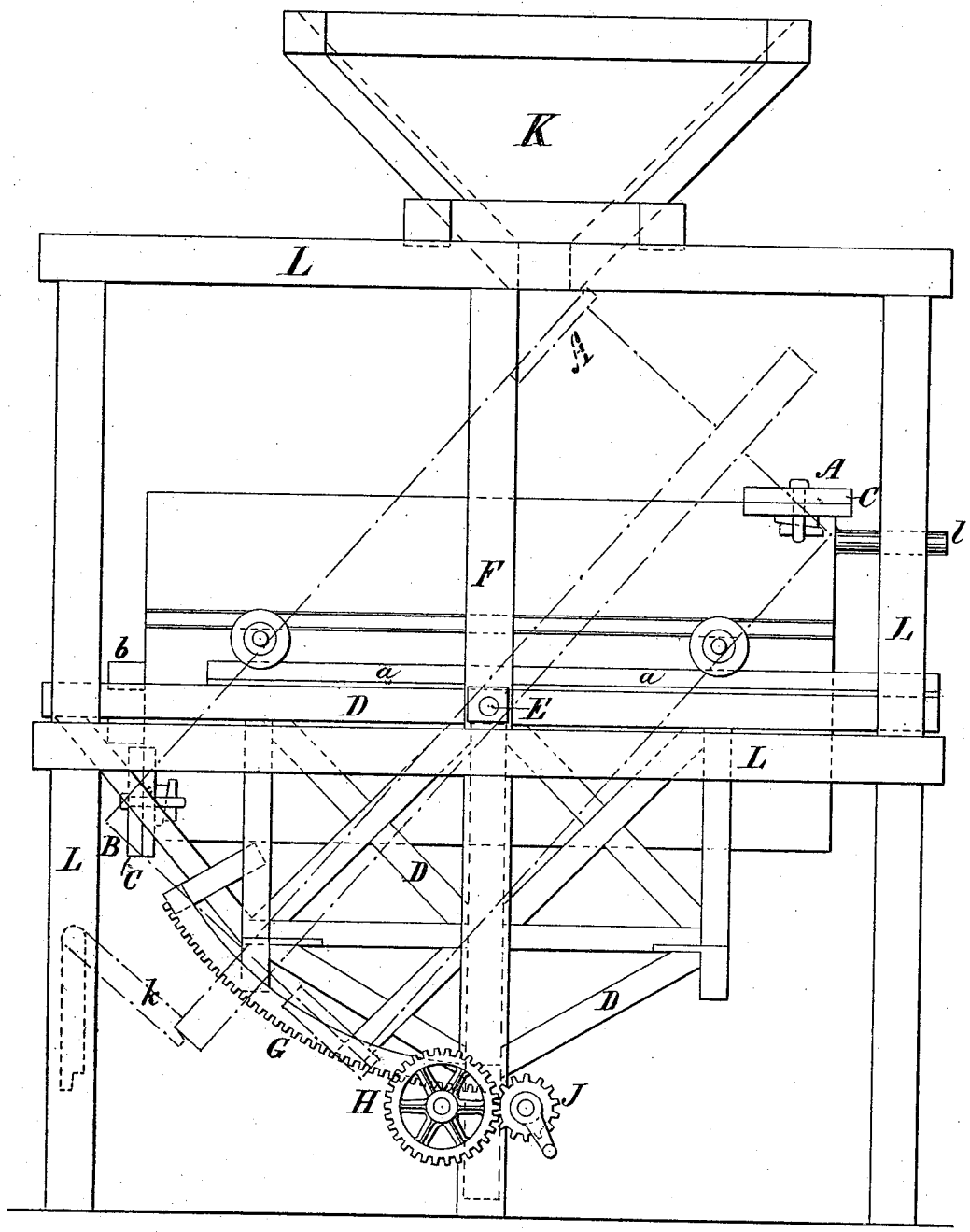
Figure 6:
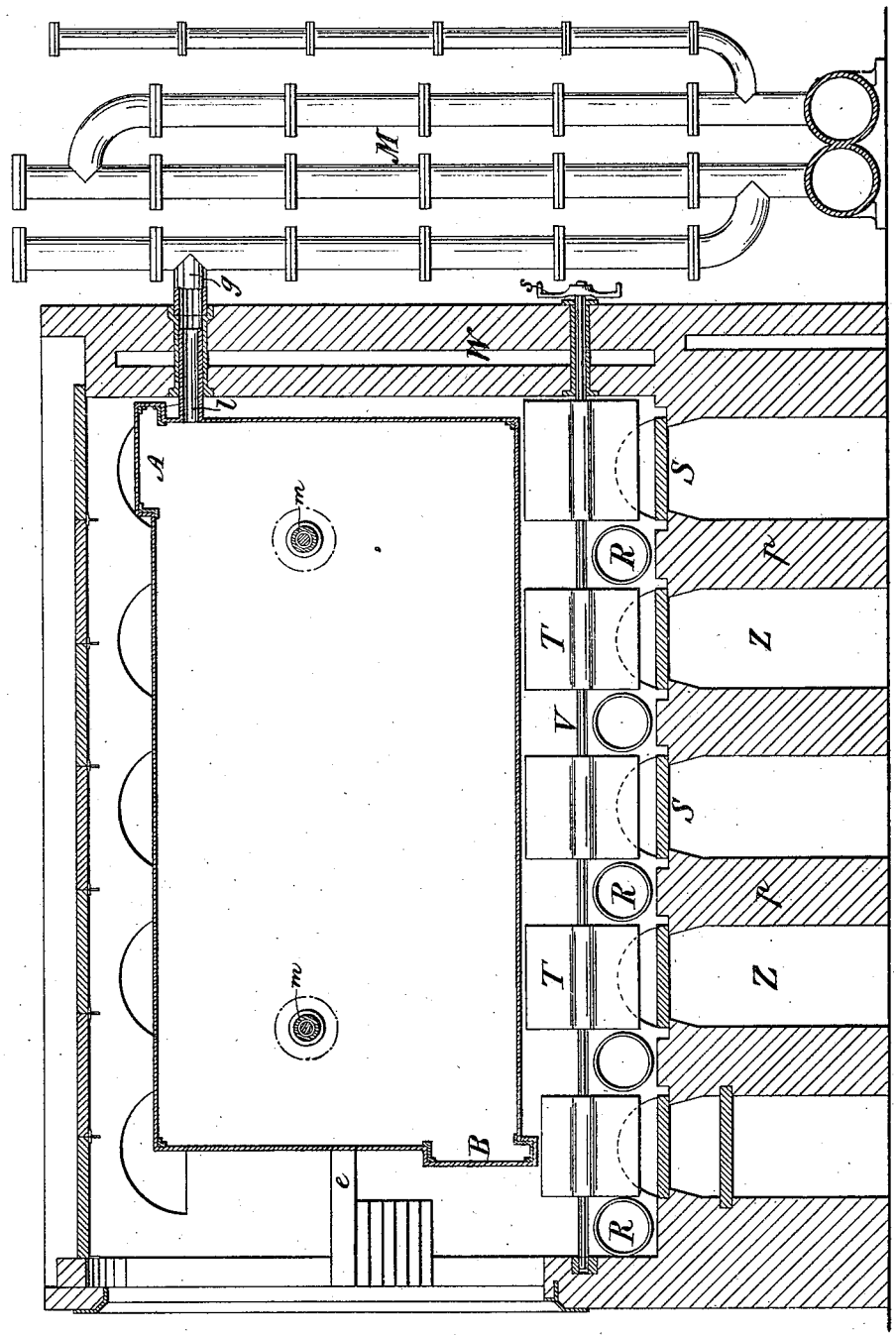

Figure 1 is a plan view of the bins for receiving and feeding the wood operated upon, the ovens and stills, and the track and cars for transferring the retorts from the former to the latter. Fig. 2 is a side elevation, showing a bin, and the construction of the device for loading and unloading the retorts. Fig. 3 is a vertical section of a retort through one axle and pair of wheels. Fig. 4 is a side elevation of the transfer-car for conveying the retorts from the bin to the ovens. Fig. 5 is a horizontal section, partly in plan, of the ovens. Fig. 6 is a vertical section of one of the ovens, showing the retort in position. Fig. 7 is a horizontal section of the front of an oven, showing the mode of sealing the door.

The retorts I are formed of metal, preferably of a rectangular form, and are supported by wheels secured to shafts rotating in bearings secured to their sides. The shafts where they pass through the retorts are protected from the action of the vapors, &c., arising from the wood when acid is being produced by means of tubes $m$ surrounding them, secured by flanges to the inner sides of the retort. These tubes not only serve to protect the axles, but also to materially strengthen the retort, and prevent the vapors from passing into the ovens. Each retort is provided with two or more man-holes for charging and discharging—one, A, on top, and the other, B, on the end. These holes are covered by plates C, secured by means of bolts, gibs, and keys to the retort. It is also provided with a pipe, $l$, through which the vapors from the wood escape. The retorts are constructed to run upon suitable tracks $a$, secured to a frame, D, and are prevented from running off the rear thereof by a stop, $b$, forming a part of the same. The frame D is pivoted at E to supports F, which form part of a frame-work, L, to which a hopper or hoppers, K, are secured, and is provided with a segmental rack, G, or a chain firmly secured thereto, into which a spur-wheel meshes, the latter being rotated by a gear-wheel, H, actuated by a spur-wheel, J. The frame is held in a horizontal position by means of the rack and train of gearing described, and swung into an inclined position, so that the man-hole A will come beneath the mouth of the hopper, and the man-hole B over the receptacle which receives the wood after the acetic acid has been removed therefrom, as shown in dotted lines Fig. 2. A bar, $k$, pivoted to the frame L, can be placed at right angles to the frame D, and serves to hold the same in the inclined position. A transfer-car, O, is provided with tracks $c$, as shown in Figs. 1 and 4, said tracks being on a level with those $a$ of the frame D. This car is strongly constructed, as shown, to receive, sustain, and transfer one, or more than one, retort, and runs upon a track placed in front of the bins X, and the ovens P, now to be described. The side and end walls of the ovens, Figs. 5 and 6, are made of brick or other refractory material, the former being constructed with rails $e$ on their sides, of the same height as those on the transfer-car upon which the retort rolls, and by which it is supported. The top is formed of fire-tile, fire-brick, or any other suitable material. A pipe, $g$, connects the oven with an air or surface condenser, M, constructed in any common and well-known manner.

In the drawings I have shown a group of ovens. These are heated by means of furnaces Z and flues R, placed transversely under and through the same, the furnaces alternating at either end of the group, so that, as in the sectional view shown in Fig. 6, where five furnaces are represented, three will be at one end and two at the other of the group.

The products of combustion pass from the furnace against corrugated plates S, which partially form the bottoms of the ovens between the division-walls p separating the furnaces, and return through flues R, which run transversely through the group of ovens just above the division-walls, and thence into the chimney r. Dampers T, secured to a shaft, V, journaled in the end walls of the oven, are located between the flues R over the corrugated plates S. These dampers are about the width of the bottom of the retorts, and when in a vertical position clear the same, as shown in Fig. 6. Their shaft is packed to prevent the egress of heat, and provided with a hand-wheel, s, or other means for operating the dampers. As the temperature of the corrugated plates S is much higher than the flues R the dampers become very useful in equalizing the temperature over the bottom of the retort. An air-chamber, W, may be provided in the sides, end, and top of the oven, to form a non-conductor of heat. Each oven is provided with a door capable of being readily opened and closed and hermetically sealed.

In the drawings, Figs. 5 and 7, I have shown a door made of a refractory material, hinged in a common and well-known way to the walls of the oven. When closed a slight space, u, is left between its inner face and the outer walls of the oven, and a V-shaped opening, t, between the four sides of the door and the beveled face of the wall of the oven. When the clay or other sealing material is placed in the opening t a portion of it is forced into the space u, forming a lock that retains the sealing material in position until the door is opened. One oven of the construction described may be used, the furnace being placed so that the heat therefrom will come in contact with the whole of the corrugated plates; but I prefer to use a group, as shown, on account of economy in fuel.

The bin may be constructed with more than one hopper, to supply simultaneously two or more retorts, and the transfer-car, constructed to convey a like number.

The retort may be of some other form than rectangular, though I prefer that form on account of its strength and facility of construction.

Mode of operation: The retort having been run upon the track a of the bin X, its end resting against the stop b, the cover C is removed from the man-hole A, and the frame D inclined by the train of gearing and segmental rack into the position shown in dotted lines, Fig. 2, the bar k being placed to hold it in that position. The slide or valve beneath the hopper is then withdrawn, and the wood, previously cut to the required size, runs therefrom into the retort until it is filled. The frame D is then returned to its normal position, the cover C secured rigidly over the man-hole, and the retort is then run upon the transfer-car O and taken to the oven, into which it is run on the tracks e, Fig. 6, its pipe l entering the pipe g and snugly fitting therein. The door of the oven is then hermetically sealed in the manner before described, and the heat soon causes the wood to give off its water, and then the acetic acid, which runs from the air or surface condenser to a common receptacle. By means of the dampers T the heat against the bottom of the retort is controllable at will, and the exact temperature to prevent the formation of tar and consequent destruction of the wood is attained. The products of distillation pass to a still, which separate the essential oils, &c., from the acetic acid.

Having thus described my invention, what I claim as new, and desire to secure by Letters Patent, is—

1. The process of producing acetic acid, which consists in subjecting the wood in a retort to the action of heat in an oven, whereby the temperature being even and controllable an acid practically free from tar is obtained, substantially as described.

2. The combination of a closed oven, a retort, and dampers, substantially as shown and described.

3. The oven, provided with a beveled face, in combination with a door, the two being constructed to leave a space, u, and opening t, to hold the sealing material, substantially as shown and described.

4. The furnaces Z, arranged alternately beneath the ovens, substantially as shown and described.

5. A retort provided with tubes m, the tube l, and man-holes A B, substantially as described.

In testimony whereof I have signed my name to this specification in the presence of two subscribing witnesses.

E. R. SQUIBB.

Witnesses:
H. T. MUNSON,
C. H. RIDENOUR.